Patented Oct. 5, 1948

2,450,756

UNITED STATES PATENT OFFICE 2,450,756

AIR-BLOWN ASPHALT AND CATALYTIC PREPARATION THEREOF

Arnold John Hoiberg, El Dorado, Ark., assignor to Lion Oil Company, a corporation of Delaware No Drawing. Application April 30, 1945, Serial No. 591,235

8 Claims. (Cl. 196—74)

The invention relates to the catalytic preparation of air-blown asphalts from high molecular weight petroleum hydrocarbons.

Asphaltic products produced by air-blowing of suitable high molecular weight petroleum hydrocarbons are employed as protective coatings, roofings, and for various industrial applications. These products, commonly termed "blown" asphalts, are preferred to straight-reduced residua because of the low degree of susceptibility to change in consistency with temperature which they show. Consequently they do not flow at relatively high temperatures or become brittle at low temperatures.

This invention relates to a process for the production of asphaltic bitumens from a given base which are much lower in susceptibility than can be produced by the usual air-blowing process. This is accomplished in accordance with my invention by air-blowing high molecular weight petroleum hydrocarbons preferably within the temperature range of 400 to 550° F. in the presence of a stable phosphorus catalytic agent, such as phosphorus pentoxide, red phosphorus, or stable sulfides of phosphorus, such as phosphorus sesquisulfide ($P_4S_3$), phosphorus sulfide ($P_4S_7$) and phosphorus pentasulfide ($P_2S_5$). All of these catalysts are stable compounds and do not decompose at the temperature required in the process. Of these, $P_2O_5$ is preferred, and the invention will be described with particular reference to the preferred catalyst.

Because of the high degree of effectiveness of the process, products which show novel characteristics and which are more adaptable for commercial applications can be produced. Thus, an asphaltic residuum can be converted to a product melting above 200° F. but which is of such a plastic consistency that it can be applied as a grease. Another advantage is that a product of given softening point and penetration will have a higher than normal ductility. The products produced remain homogeneous and show no tendency to separate into layers of oil and asphalt, nor do they lose their adhesive power. Products of low susceptibility produced by blowing highly paraffinic residua have these faults.

In the usual process of oxidation air is contacted with a high molecular weight hydrocarbon base which has been heated to a temperature normally between 400° F. and 550° F. The customary base is a crude oil residue, however, lubricating oil distillates of low to intermediate viscosity indices, i. e., if they are not too paraffinic in nature, and solvent extracts from lubricating oil stocks may be air-blown to produce asphaltic products. Depending only slightly upon the temperature, type of blowing still, and rate of air input, a given penetration invariably will be obtained when a given base is oxidized to a specified softening point. Also, with the same equipment and at the same temperature and rate of air input the time required for oxidation of a given base to a specified softening point invariably will be substantially the same.

However, by admixture of a small proportion of the catalytic agent with the asphaltic fluxes or other high molecular weight hydrocarbon bases, such as lubricating oil distillates or extracts therefrom, the course of the reactions which occur during the air-blowing process is greatly changed as is shown by the properties of the product.

The data of Table 1 describe the effect obtained by blowing asphalts and fluxes in the presence of 3.0% of phosphorus pentoxide. In every case an asphaltic product with a higher penetration at a given softening point was obtained than by blowing the asphalt or fluxes without the catalyst. With the Shuler flux a longer period of time was required to blow to a given softening point in the presence of the catalyst. With the Smackover flux at a temperature of 425° F. a shorter period of time was required, and at 525° F. a longer time. The increase obtained in penetration seems to be independent of the time required.

In Table 2, results obtained by the blowing of solvent extracts obtained from lubricating oil stocks are shown. In both examples an increase in penetration was obtained at a given softening point. With these stocks the presence of the phosphorus pentoxide increased the time required to reach a given softening point.

The slight effect which phosphorus pentoxide has on changing the time required for the blowing of most stocks to a given softening point is a distinct advantage in that the blowing process can be easily controlled and a rapid rise in temperature is not noted as is the case if catalysts highly active in speeding the reactions are used.

The improvement obtained by practice of this discovery is shown by the higher than normal penetrations obtained at a given softening point. Another measure of this improvement is given by the calculated values for penetration temperature susceptibility (PTS) as shown in Tables 1 and 2. The PTS, based on the fact that at the softening point of an asphalt the penetration will be about 800, is calculated according to the formula:

$$PTS = \frac{\text{Log } 800 - \text{Log Pen. at } 25°\text{ C.}}{\text{S.P. (R and B) °C.} - 25}$$

It thus represents the slope of the line relating the logarithm of penetration to the temperature and measures the average susceptibility over a wide temperature range, from 25° C. (77° F.) to the softening point.

Without exception the values for PTS were found to be lower for the catalytically blown asphalts than for the straight-blown asphalts. In most examples a very decided decrease was shown.

A slight increase in ductility was noticed upon blowing to the same softening point with the catalyst. As shown by the data of Table 3, a great increase in ductility is obtained if an asphaltic product of the same softening point and penetration is produced by a catalytic blowing as compared with a straight-blown product. Thus, in Table 3, the blowing of a Smackover straight reduced asphalt of 136 penetration at 77° F. with 3% of phosphorus pentoxide, produced a product melting at 198° F. with a penetration of 53 and with a ductility at 77° F. of 7 cm. At approximately this softening point and penetration a straight-blown asphalt, Example 2 of Table 3, measured 2 cm. in ductility at 77° F. Since a flux of low viscosity and consequently low in flash point was required to be blown to obtain a penetration of 53 at this softening point, the blowing operation was more hazardous. Also heating of the product in subsequent application will need to be made with care. Blowing of a light Smackover flux was not satisfactory in that at a penetration of 53, a softening point of only 153° F. was obtained. Use of the catalysts thus represents a great advantage in preparation of products of high ductility and with a low penetration-temperature susceptibility.

Blowing of the same base to the same softening point with addition of catalyst was found to increase the viscosity of the product over that obtained by the non-catalytic blowing to the same softening point. The asphalt represented by Example 4, Table 1, showed a Saybolt furol viscosity at 350° F. of 254 seconds when blown in the presence of the catalyst. Air blowing under the same conditions and to the same softening point, but without the catalyst produced a product of 150 seconds Saybolt furol viscosity at 350° F. In many cases catalytically blown products were too viscous for the viscosity to be run at 350° F. so that a numerical comparison could not be made. This increase in viscosity indicates that the catalyst lowers the susceptibility to temperature changes over a very wide range of temperature, since these products are all softer at low temperatures, as shown by their higher than normal penetrations.

This process is not limited to the blowing of fluxes, asphalts, and lubricating distillates and solvent extracts. Blends of these materials with lubricating oil distillates may be blown. Thus, a Smackover lubricating oil distillate of 571 sec. Saybolt Universal viscosity at 100° F. was blended with a Smackover flux of 24 sec. float at 122° F., the blend being in a 50/50 proportion by weight. Three percent by weight of phosphorus pentoxide was mixed with this blend. After air blowing at a temperature of 450° F., a product with a softening point of 210° F. and with a penetration at 77° F. of greater than 400 was obtained. This product, of a grease-like consistency, can readily be applied as a rust preventative coating or used as a temperature stable grease.

As another illustration of a blending procedure, the following is cited: A Smackover flux, 24 sec. float at 122° F., was blown in the presence of 3.5% of phosphorus pentoxide at a temperature in the range of 460–470° F. to produce a product with a softening point (R and B) of 304° F. and a penetration at 77° F. of 95 mm./10. To this product was added a cylinder stock of 180 sec. Saybolt Universal viscosity at 210° F. With addition of 25% by weight of this cylinder stock a product melting at 205° F. and with a penetration at 77° F. of greater than 300 was obtained. This product was very sticky, somewhat elastic, and showed the property of being able to coat surfaces of steel, galvanized iron, or tin, even though they were wet with water. Thus, it is valuable as a coating for pipes and other exposed metal work for protection against corrosion.

As an example of the practice in plant operation, the following may be cited: 250 barrels of a flux of 52 sec. float at 122° F. straight reduced from Smackover crude oil was charged to a cylindrical blowing still set on end. The charge was heated to a temperature of 200° F. by circulating through a pipestill. Approximately 15 barrels of this heated charge was withdrawn into a separate small vessel. Phosphorus pentoxide equal in weight to 0.5 percent of the weight of the total flux charge was slowly added with constant stirring to the withdrawn portion of the charge. This suspension of phosphorus pentoxide in the flux was pumped into the blowing still. The total charge was heated to a temperature in the range of 450–500° F. by circulation through the pipestill. By withdrawing from the bottom of the blowing still through a cone bottom, any of the catalyst which settled could be remixed. Upon reaching the desired temperature range, air at the rate of 800 cubic feet per minute was introduced into the bottom of the blowing still through a spider. The temperature was maintained in the desired range by circulation through a pipestill which could be used as a heater or as a cooler if the fire was out. After a time of six hours, a sample was withdrawn and found to have a softening point (R and B) of 163° F. and a penetration at 77° F., 100 g., 5 sec., of 90 mm./10. Blowing of this same flux under identical conditions without addition of the catalyst was found to produce a product at the same softening point with a penetration at 77° F., 100 g., 5 sec., of 46 mm./10.

In summary, the data of the examples show that the asphalts produced with the aid of phosphorus pentoxide have characteristics which make them greatly superior to the straight-blown products. Their softening point is much higher for a given consistency and consequently they can be used as protective coatings at higher temperatures and on steeper surfaces without showing flow. At low temperatures they have a higher ductility and are less brittle. Since with the aid of phosphorus pentoxide asphalts of a given softening point and penetration can be produced from a base of higher viscosity, the oil fraction of the blown asphalt will be higher in viscosity and consequently the tendency to stain paper and other porous sheets will be less. (The staining tendency of asphalts has been discussed in my Patent No. 2,421,421, dated June 3, 1947.)

This process, besides being adaptable to produce asphalts of novel character, possesses another commercial advantage in that products which vary widely in their softening point-penetration relationship can be produced by air-blowing a given stock to which addition has been made of varying weights of phosphorus pentoxide. The advantage of this is great since processing of only a few base stocks is required to obtain a complete range of air-blown asphalts. If the refiner has only a limited selection of base stocks, products which could not be produced before can be prepared with the aid of the catalyst and his market will become greatly expanded.

General conditions under which the process will operate are:

The temperature of the charged stock during air-blowing will normally be maintained within the range of 400°–550° F.

The content of the stable phosphorus catalyst will normally be from 0.1% to 5% by weight of the stock charged.

The rate of air input will vary widely dependent upon the type of still employed. Rates of from 10 to 30 cubic feet of air per minute per ton of charge are common. Although the rate of air input does change somewhat the penetration obtained for a given softening point, the action of the phosphorus pentoxide added is in all cases to lower the penetration-temperature susceptibility of the blown product.

The product if desired can be blown with steam near the end of the blowing cycle to remove any objectionable odors which might be present from oils formed during the blowing process. The steam can conveniently be introduced through the air-blowing coils. Since steaming reduces the penetration and raises the softening point, it should be started before the product of desired softening point is obtained.

The test results given hereinbefore and in the attached tables were determined according to the procedure described under the following ASTM designations:

Softening point (R and B) ---- ASTM D 36–26
Penetration ------------------ ASTM D 5–25
Float ------------------------ ASTM D 139–27
Saybolt viscosity ------------ ASTM D 88–38

TABLE 1

*Effect of air blowing of fluxes and asphalts with and without addition of 3.0 percent of phosphorus pentoxide*

| Ex. No. | Base | Temperature of Air Blowing, °F. | Properties of stock air-blown in presence of $P_2O_5$ for 150 minutes | | | | | | Properties of stock air-blown under identical conditions, and to same softening point (R and B), but without $P_2O_5$. | | | | | |
|---|---|---|---|---|---|---|---|---|---|---|---|---|---|---|
| | | | S. P. (RB) °F. | Pen. in 1/10 mm. at— | | | Duc. at 77° F. cm. | PTS×100 [1] | Time required, Minutes | Pen. in 1/10 mm. at— | | | Duc. at 77° F. cm. | PTS×100 [1] |
| | | | | 77° F. 100 g. 5 sec. | 115° F. 50 g. 5 sec. | 32° F. 200 g. 60 sec. | | | | 77° F. 100 g. 5 sec. | 115° F. 50 g. 5 sec. | 32° F. 200 g. 60 sec. | | |
| 1 | Flux of 86 seconds Saybolt Furol Viscosity at 210° F. straight reduced from Shuler Crude Oil. | 425 | 150 | Above 300 | ------ | 120 | 3.5 | Less than 1.0 | 135 | 75 | 170 | 45 | 3.4 | 2.53 |
| 2 | | 475 | 194 | 159 | ------ | 66 | 3.2 | 1.1 | 140 | 38 | 60 | 25 | 3.0 | 2.04 |
| 3 | | 500 | 221 | 45 | 74 | 25 | 2.8 | 1.6 | 140 | 28 | 44 | 18 | 2.2 | 1.82 |
| 4 | Flux of 189 seconds Saybolt Furol Viscosity at 210° F. straight reduced from Smackover Crude Oil. | 425 | 185 | 85 | 141 | 48 | 4.5 | 1.6 | 145 | 40 | 59 | 14 | 3.8 | 2.17 |
| 5 | | 525 | 318 | 35 | 100 | 25 | 2.8 | 1.03 | 160 | 11 | 15 | 9 | 0.2 | 1.39 |
| 6 | Asphalt of 43 penetration at 77° F. straight reduced from Urbana crude oil. | 475 | 239 | 18 | 38 | 8 | 5.0 | 1.8 | 170 | 8 | 10 | 7 | 0.8 | 2.22 |

[1] $PTS \times 100 = 100 \times \dfrac{\text{Log } 800 - \text{Log Pen. at } 25°\text{ C.}}{S. P. (R \text{ and } B)°C - 25}$

TABLE 2

*Effects of air-blowing of lubricating oil extracts with and without addition of 3.0% of phosphorus pentoxide*

| Base | Phenol extract of 193 seconds Saybolt Universal viscosity at 210° F. derived from a residual lubricating oil | | Furfural extract of 240 seconds Saybolt Universal viscosity at 210° F. derived from a propane extracted lubricating oil | |
|---|---|---|---|---|
| Example No. | 1 | 2 | 3 | 4 |
| Temperature of Air-Blowing, °F. | 470 | 470 | 470 | 470 |
| Content of $P_2O_5$, Percent by wt. | 0 | 3.0 | 0 | 3.0 |
| Time of Air-Blowing, Minutes | 225 | 270 | 245 | 260 |
| S. P. (R and B) ° F. | 195 | 213 | 185 | 186 |
| Penetration at 77° F., 100 g., 5 sec., mm./10 | 22 | 29 | 7 | 11 |
| Penetration at 115° F., 50 g., 5 sec., mm./10 | 36 | 47 | 21 | 23 |
| Penetration at 32° F., 200 g., 60 sec., mm./10 | 15 | 18 | 5 | 8 |
| PTS×100 | 2.4 | 1.9 | 3.4 | 3.1 |

TABLE 3
Action of phosphorus pentoxide in producing air-blown asphalts of high ductility

| Example No. | 1 | 2 | 3 |
|---|---|---|---|
| Base | Straight-reduced Smackover asphalt of 136 penetration at 77° F. | Straight-reduced Shuler flux at 25 seconds S. Furol Viscosity at 210° F. | Straight-reduced Smackover flux of 80 seconds S. Furol Viscosity at 210° F. |
| Catalyst and Concentration, Per Cent by Wt. | $P_2O_5$, 3.0% | None | None |
| S. P. (R and B) ° F | 198 | 185 | 153 |
| Penetrations in 1/10 mm. at— | | | |
| 77° F., 100 g., 5 sec. | 53 | 53 | 53 |
| 32° F., 200 g., 60 sec. | 24 | 36 | 30 |
| 115° F., 50 g., 5 sec. | 110 | 97 | 105 |
| Ductility at 77° F., cm | 7.0 | 2.0 | 4.0 |
| Flash, C. O. C., ° F | 580 | 450 | 520 |
| P. T. S.×100 | 1.76 | 1.97 | 2.80 |

Air-blowing of high molecular weight hydrocarbons to which either red phosphorus or one of the sulfides of phosphorus has been added Tables 4 and 5 are attached to show examples of the action of the above catalysts in the air-blowing of asphalts, and of extracts from lubricating oil stocks. The advantages of addition of these catalysts are similar to those described for phosphorus pentoxide, as are also their conditions of employment.

Red phosphorus and the sulfides of phosphorus are stable compounds and do not decompose at the temperatures required in the process.

The order of preference in the employment of these compounds is:

$P_4S_3$ (phosphorus sesquisulfide)
$P_4S_7$ (phosphorus sulfide)
Red phosphorus
$P_2S_5$ (phosphorus pentasulfide)

TABLE 4
Effect of air-blowing of asphaltic fluxes with and without addition of red phosphorus and of sulfides of phosphorus

| Base | Flux of 86 seconds Saybolt Furol Viscosity at 210° F. straight-reduced from Shuler Crude Oil | | Flux of 189 seconds Saybolt Furol Viscosity at 210° F. straight-reduced from Smackover Crude Oil | | | | | Flux of 56 seconds Saybolt Furol Viscosity at 210° F. straight-reduced from Urbana Crude Oil | |
|---|---|---|---|---|---|---|---|---|---|
| Example No | 1 | 2 | 3 | 4 | 5 | 6 | 7 | 8 | 9 |
| Catalyst | None | $P_4S_3$ | None | Red Phosphorus | None | $P_2S_5$ | $P_4S_7$ | None | $P_4S_3$ |
| Percentage by wt | 0 | 3.0 | 0 | 3.0 | 0 | 3.0 | 3.0 | 0 | 2.0 |
| Temperature of Charge, ° F | 475 | 475 | 475 | 475 | 475 | 475 | 475 | 490 | 490 |
| Time, Minutes | 135 | 150 | 160 | 150 | 190 | 150 | 150 | 125 | 110 |
| S. P. (R and B) ° F | 183 | 183 | 247 | 247 | 284 | 284 | 285 | 176 | 187 |
| Penetration at 77° F., 100 g., 5 sec., mm./10 | 41 | 87 | 18 | 28 | 14 | 37 | 49 | 28 | 62 |
| Penetration at 115° F., 50 g., 5 sec., mm./10 | 65 | 154 | 25 | 35 | 16 | 52 | 109 | 55 | 113 |
| Penetration at 32° F., 200 g., 60 sec., mm./10 | 24 | 42 | 13 | 22 | 10 | 21 | 35 | 17 | 33 |
| Ductility at 77° F., 5 cm./min., cm | 4.1 | 4.5 | 1.5 | 2.5 | 1.0 | 2.3 | 2.2 | 3.8 | 5.5 |
| PTS×100 [1] | 2.2 | 1.6 | 1.7 | 1.5 | 1.5 | 1.2 | 1.0 | 2.6 | 1.8 |

[1] $PTS \times 100 = 100 \times \dfrac{\text{Log } 800 - \text{Log Pen. at } 25° C.}{\text{S. P. (R and B) ° C.} - 25}$

TABLE 5
Effect of air-blowing at 470° F. of lubricating oil extracts with and without addition of 3.0 percent of phosphorus pentasulfide

| Base | Phenol extract of 193 seconds Saybolt Universal viscosity at 210° F., derived from a residual lubricating oil | | Furfural extract of 240 seconds Saybolt Universal Viscosity at 210° F. from a propane extracted lubricating oil | |
|---|---|---|---|---|
| Example No | 1 | 2 | 3 | 4 |
| Content of $P_2S_5$, Per cent by weight | 0 | 3.0 | 0 | 3.0 |
| Time of Air-Blowing, Minutes | 225 | 240 | 245 | 355 |
| S. P. (R and B)° F | 195 | 200 | 194 | 194 |
| Penetration at 77° F., 100 g., 5 sec., mm./10 | 22 | 52 | 6 | 11 |
| Penetration at 115° F., 50 g., 5 sec., mm./10 | 36 | 110 | 17 | 26 |
| Penetration at 32° F., 200 g., 60 sec., mm./10 | 15 | 24 | 3 | 8 |
| PTS×100 | 2.4 | 1.7 | 3.3 | 2.9 |

I claim:

1. A process for producing blown asphalts which comprises air-blowing a high molecular weight petroleum hydrocarbon in the presence of a phosphorus catalyst which is stable at the temperature required in the process said catalyst being selected from a group consisting of phosphorus pentoxide, stable phosphorus sulfides and red phosphorus.

2. A process as set forth in claim 1 wherein the temperature is maintained within the range of 400 to 550° F.

3. A process as set forth in claim 1 wherein the catalyst is phosphorus pentoxide.

4. A process as set forth in claim 1 wherein the catalyst is a stable phosphorus sulfide.

5. A process as set forth in claim 1 wherein the catalyst is red phosphorus.

6. A process as set forth in claim 1 wherein the catalyst is employed in the percentage of .1 to 5% by weight of the stock.

7. An air-blown asphalt produced by air-blowing a high molecular weight hydrocarbon in the presence of a phosphorus catalyst selected from a group consisting of phosphorus pentoxide, stable phosphorus sulphides and red phosphorus, said air-blown asphalt in its final form containing the phosphorus catalyst and being characterized by relatively low susceptibility to temperature change and by relatively high viscosity at elevated temperatures as compared with asphalts produced by an air-blowing process carried out under the same conditions but not including the use of said phosphorus catalyst.

8. An air-blown asphalt produced by air-blowing a high molecular weight hydrocarbon in the presence of a phosphorus catalyst consisting of phosphorus pentoxide, said air-blown asphalt in its final form containing the phosphorus catalyst and being characterized by relatively low susceptibility to temperature change and by relatively high viscosity at elevated temperatures as compared with asphalts produced by an air-blowing process carried out under the same conditions but not including the use of said phosphorus catalyst.

ARNOLD JOHN HOIBERG.

REFERENCES CITED

The following references are of record in the file of this patent:

UNITED STATES PATENTS

| Number | Name | Date |
| --- | --- | --- |
| 1,487,020 | Mittasch et al. | Mar. 18, 1924 |
| 2,121,437 | McConnell | June 21, 1938 |
| 2,179,208 | Burk et al. | Nov. 7, 1939 |
| 2,281,728 | Thelen | May 5, 1942 |
| 2,340,640 | Burk | Feb. 1, 1944 |

FOREIGN PATENTS

| Number | Country | Date |
| --- | --- | --- |
| 319,986 | Canada | Feb. 23, 1932 |